(No Model.)

P. D. HARTON.
DOUGH PRESS FOR CAKE OR BISCUIT MACHINES.

No. 549,719. Patented Nov. 12, 1895.

Witnesses:
Thomas M. Smith
Louis Winterberger

Inventor,
Pembroke D. Harton,
By J. Walter Douglass
Attorney.

UNITED STATES PATENT OFFICE.

PEMBROKE D. HARTON, OF PHILADELPHIA, PENNSYLVANIA.

DOUGH-PRESS FOR CAKE OR BISCUIT MACHINES.

SPECIFICATION forming part of Letters Patent No. 549,719, dated November 12, 1895.

Application filed May 18, 1895. Serial No. 549,757. (No model.)

*To all whom it may concern:*

Be it known that I, PEMBROKE D. HARTON, a citizen of the United States, residing at the city of Philadelphia, in the county of Philadelphia and State of Pennsylvania, have invented certain new and useful Improvements in Dough-Presses for Cake or Biscuit Machines, of which the following is a specification.

My invention has relation to machines for making cakes or biscuit, and in such connection it relates more particularly to the construction, arrangement, and mode of operation of a press for continuously feeding and compressing the dough into strips or sheets in its passage to and through nozzles or openings onto suitable receptacles to assume required condition for becoming subsequently cakes or biscuit.

The principal object of my invention is to provide a comparatively simple, durable, and effective continuous and positive feed dough-press, whereby clogging or choking of the mass is avoided and also requisite compression of the dough-like or plastic mass therethrough is insured.

My invention consists of a continuous dough-press for a cake or biscuit machine provided with positive actuating mechanism therefor and constructed and arranged in the manner hereinafter described and claimed.

The nature and scope of my invention will be more fully understood from the following description, taken in connection with the accompanying drawings, forming part hereof, and in which—

Figures 1, 2:
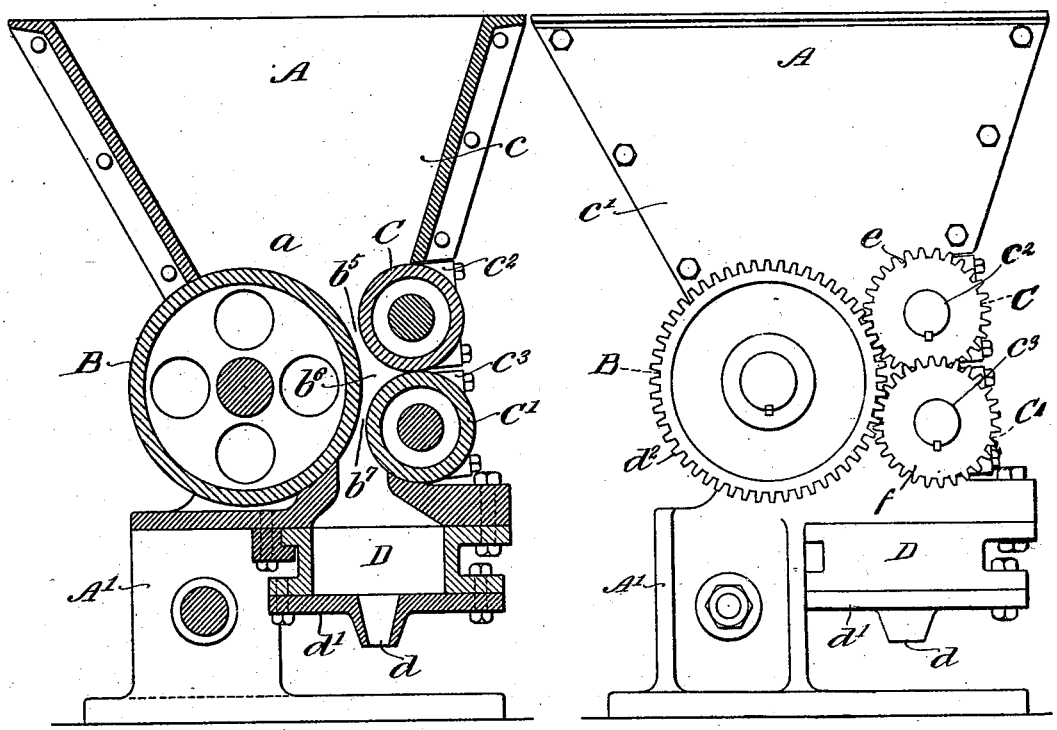
Figure 3:
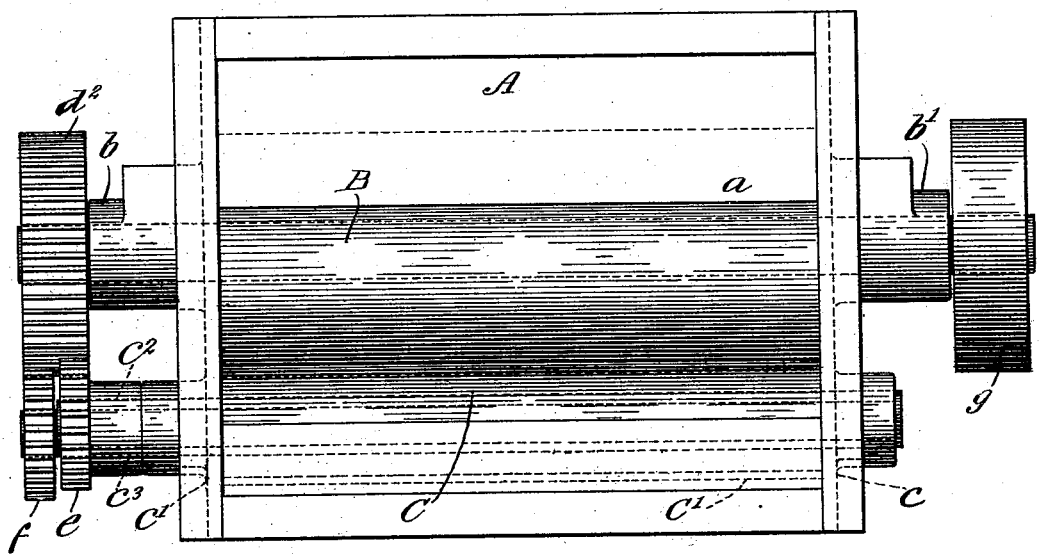

Figure 1 is a vertical central sectional view through the supply-hopper and receiving chamber or receptacle, with its exit-nozzles, dies, or openings and the positive feed mechanism interposed between the same embodying features of my invention. Fig. 2 is a side elevational view of said dough-press; and Fig. 3 is a top or plan view of the hopper, showing the driving-pulley for the positive feed of the press thereof.

Referring to the drawings, A is the feed or supply hopper of the press of any preferred shape and secured to or formed integral with a standard A'. In the throat $a$ or contracted portion of the hopper is mounted a plain or smooth surface drum B and opposite thereto two smaller rolls C and C', the respective rolls being journaled in the walls $c$ and $c'$ of the hopper, as illustrated in Fig. 3. The throat $a$ or contracted portion of the hopper A merges into a receiving-chamber D, which is provided in the base thereof with projecting tapering nozzles, molds, dies, or openings $d$, which are formed integral or secured to the base-plate $d'$ of the chamber D in any preferred manner, as clearly illustrated in Fig. 1. The drum B and respective small rolls B, C, and C' are rotated toward each other and each at a uniform speed, as indicated by the arrows in Fig. 1, by means of a wide-face gear-wheel $d^2$, which is mounted on one end of the journal $b$ of the roll B, and by means of the narrow-face gear-wheels $e$ and $f$, mounted, respectively, on the journals $c^2$ and $c^3$ of the rolls C and C' in advance of one another and, meshing, respectively with the large gear-wheel $d^2$, as clearly illustrated in Fig. 2. Motion is imparted to the respective gears so mounted, as above explained, by means of a belt (not shown) applied to the pulley $g$ on the projecting journal $b'$ of the drum B, as clearly shown in Fig. 3, so as to actuate positively the said gears and to thereby impart a uniform motion to the respective primary and secondary rolls to cause the dough from the supply-hopper A to be drawn downward through the narrow passage-way $b^5$, as shown in Fig. 1, into the enlarged passage-way $b^6$, and thence to condense or compress the same in its passage through the more contracted passage-way $b^7$ into the receiving nozzle-chamber D and preparatory to the discharge of the dough-like or plastic mass through the nozzles, molds, dies, or openings $d$ onto a suitable pan or into any type of receptacle to subsequently assume the required shape or condition for working into cakes or biscuit and after baking for use.

The operation of the herein before-described press is as follows: The dough is deposited in the supply-hopper A and by the rapid and positive rotation of the drum B and small rolls C and C' of different dimensions—that is to say, the drum B, with respect to the small rolls C and C' and caused to rotate toward each other—is forced downward between the same through the passage-way $b^5$ and uniformly into the enlarged passage-way $b^6$, and then through the passage-way $b^7$ into the chamber D and outward through the nozzles or dies $d$ thereof onto or into pans or other receptacles. (Not shown.) By the arrangement above explained, during the operation of the press after starting up, the chamber D will always contain its full quota of dough or similar matter for discharge through the nozzles, dies, molds, or openings $d$ in the base-plate thereof. The manner in which the two rolls C and C' are caused to rotate toward the drum B is fully illustrated in Figs. 2 and 3 and is accomplished by means of the large and wide face gear-wheel $d^2$, meshing with the small narrow-face gear-wheels $e$ and $f$ and located a sufficient distance from each other in their engagement with the large gear-wheel $d^2$ as to receive motion independently therefrom without either of the small gear-wheels meshing with each other.

Having thus described the nature and objects of my invention, what I claim as new, and desire to secure by Letters Patent, is—

1. A dough press provided with a feed hopper, a smooth surfaced drum, and two small smooth surfaced rolls arranged in contact with one another and alongside of said drum, and adapted to rotate at a uniform speed, and means for actuating said drum and rolls, substantially as and for the purposes described.

2. A dough press provided with a feed hopper having a throat and a receiving chamber with exit nozzles or dies projecting from the bottom of said chamber, a smooth surfaced drum and two small smooth surfaced rolls arranged one above the other and in contact and directly alongside said drum and adapted to rotate at a uniform speed one with respect to the others and means for positively actuating said drum and rolls, substantially as and for the purposes described.

In testimony whereof I have hereunto set my signature in the presence of two subscribing witnesses.

PEMBROKE D. HARTON.

Witnesses:
FRANK H. MASSEY,
GILLISON C. LOTT.